Aug. 31, 1948.  R. MAYNE  2,448,492
METHODS AND APPARATUS FOR CENTRIFUGALLY
FORMING OF SHEET THERMOPLASTICS
Filed March 29, 1945  2 Sheets-Sheet 1

Inventor
Robert Mayne

By
H. H. Oldham
Attorney

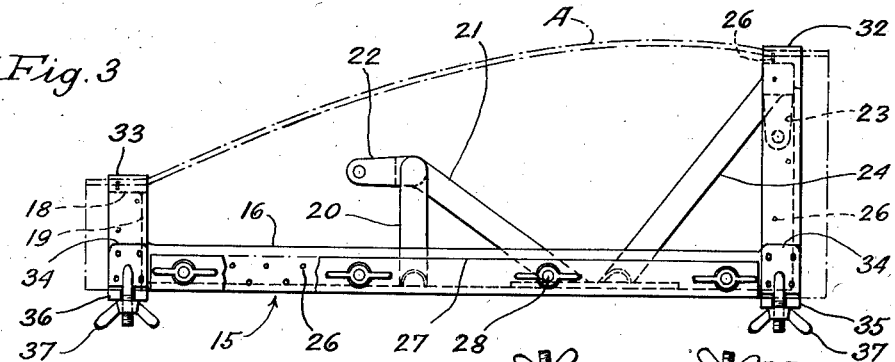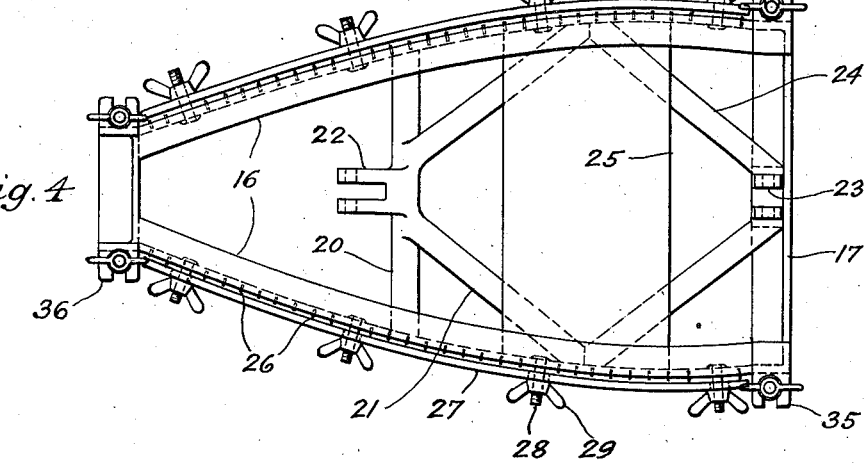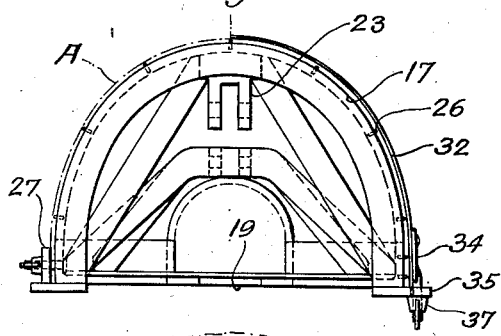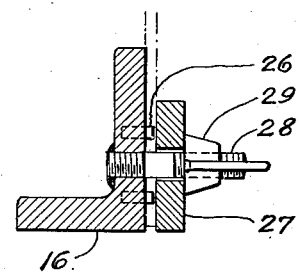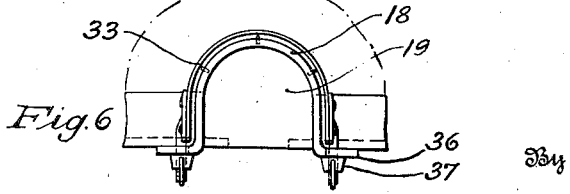

Patented Aug. 31, 1948

2,448,492

UNITED STATES PATENT OFFICE 2,448,492

METHOD AND APPARATUS FOR CENTRIFUGALLY FORMING OF SHEET THERMOPLASTICS

Robert Mayne, Akron, Ohio, assignor to Goodyear Aircraft Corporation, Akron, Ohio, a corporation of Delaware Application March 29, 1945, Serial No. 585,504

15 Claims. (Cl. 18—19)

1

This invention relates to methods and apparatus for centrifugal forming of sheet material made of thermoplastics in general, and, in particular, of methyl methacrylate, known as "Plexiglas."

Heretofore it was known to form "Plexiglas" in sheet form into bubbles for canopies of airplanes, or for other purposes, by inserting it in heated condition between a male and female forming die for giving it the desired shape by the use of pressure. In other cases, only one such die, either male or female, was used in conjunction with air or liquid pressure, or the method of free blowing the article through a jig by air pressure was employed. In using form dies, there is always the danger that die marks are left on the article, and in free blowing, the cross-sectional shape of a bubble is practically limited to that of a half circle which is not always satisfactory.

It is the general object of the invention to avoid and overcome the foregoing and other difficulties of and objections to prior art practices of the provision of improved means and methods for forming bubbles which are not of half circular, but of more parabolic cross-sectional shape to increase the height thereof as compared to bubbles made by the free blowing process.

Another object of the invention is to provide relatively inexpensive, easily operated, relatively rapid methods and apparatus for forming a sheet into a bubble by centrifugal force and avoiding pressure means of any kind.

Another object of the invention is the provision of an apparatus including a bubble jig adapted for centrifugally forming bubbles of various longitudinal and cross-sectional contours.

Another object of the invention is to provide motor driven apparatus which is easily adjustable so that its rotational speed can be regulated and the centrifugal forces varied, either by changing the motor speed or by changing the center of gravity of the bubble sheet, draped around a jig, from the revolving shaft.

Another object of the invention is to provide the apparatus with adjustments for longitudinally influencing the centrifugal forces to which the various bubble cross sections are subjected.

Another object of the invention is to provide the apparatus with adjustments for producing articles having cross-sectional contours from between half-circular to a height considerably larger than half the width of the bubble base.

2

The aforesaid objects of the invention and other objects which will become apparent as the description proceeds are achieved by providing methods of manufacture and an apparatus, including a jig, over which a thermoplastic sheet to be formed is draped and clamped thereto. The jig is fastened to a power driven revolvable shaft by two adjustable radial arms which make it possible to change the radial distance of the jig from the shaft at the front and rear end, whereby the centrifugal forces acting upon the article to be formed can be regulated longitudinally thereof. Accordingly, the longitudinal as well as the cross-sectional contours of the article can be varied at will within wide limits, making it possible to obtain streamlined bodies of a height greater than half their base width. Bubbles obtained by this method of fabrication also have very good optical properties and are entirely free from mark-offs.

For a better understanding of the invention, reference should be had to the accompanying drawings, wherein Figure 1 is a side view of one embodiment of the invention with the top portion in cross section.

Figure 3 is an enlarged side view of the bubble jig,

Figure 4 is a bottom plan view of Figure 3,

Figure 5 is an end view of Figure 3 with one half of the circumferential strap omitted, Figure 6 is a fragmentary end view of Figure 3 taken opposite from that of Figure 5, and Figure 7 is a detail showing the grip of the sheet material on the jig.

Figure 1:
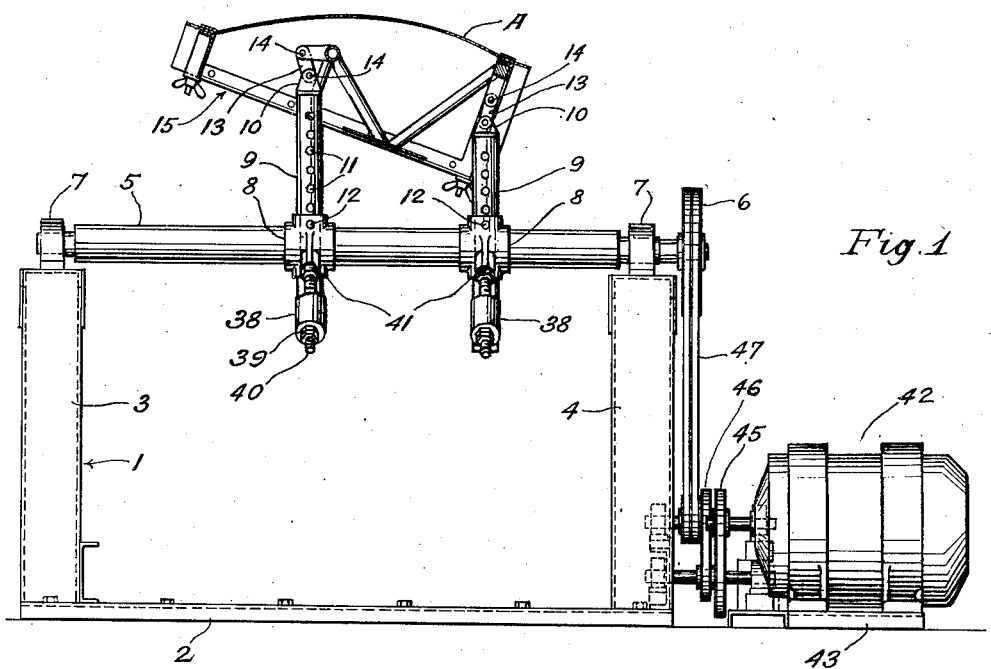
Figure 2:
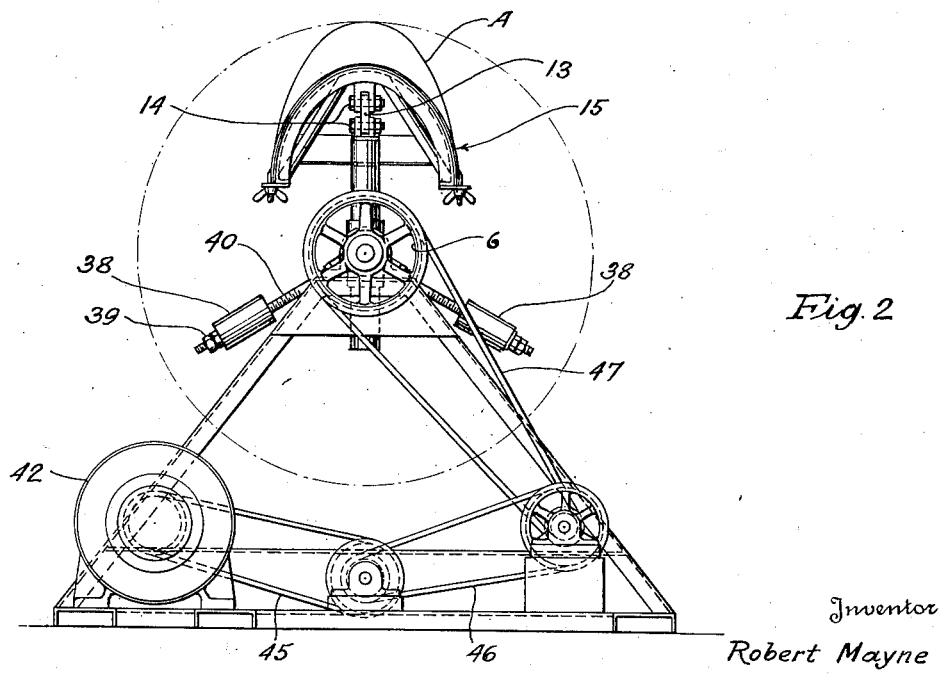
Figure 2 is an end view of Figure 1.

Although the apparatus may be equipped with a plurality of jigs in equilibrium with each other, the invention so far has been used only in conjunction with a single jig and has been so illustrated and will be so described.

With specific reference to the form of the invention illustrated in the drawings, the numeral 1 indicates in general a framework consisting of base channels 2 on which is mounted a pair of triangular side supports 3 and 4 made up of U-channels, preferably welded together. A revolvable shaft 5 provided at one end with a belt pulley 6 is carried in bearings 7 mounted on the supports 3 and 4. Between these bearings are secured to the shaft 5 two cross heads 8, spaced from each other and in each of which is slidable, passing through the shaft, a tubular arm 9 provided at one end with a hinge joint 10. The arms contain a series of holes 11 by which their effective length can be controlled and through which they are secured by a pin 12 to the cross heads 8. To the hinge joints 10 are attached links 13 swingable about bolts 14, whereas to the outer ends of the links is attached by bolts 14 a jig 15, designated as a whole.

The jig 15 (Figure 3) consists of members 16 of angle cross section determining the base contour of an article A to be formed of plastic sheet material into a bubble, for instance, for an airplane canopy. At its large end an arch 17 of angle cross section is welded or otherwise connected to the members 16, whereas at the small end an arch 18 of flat cross section is welded to a vertical plate 19 which in turn is united with the base members 16. A tubular transverse member 20 and two diagonal tubular braces 21 are joined together at the top with a supporting lug 22 hinged to one of the links 13, and at the bottom with the base members 16, whereas the arch 17 containing a hinge block 23 connecting to the other link 11 is braced against the base members by tubes 24. In addition, the base members 16 are connected by a stiffening plate 25 to prevent the spreading thereof. For securely holding the plastic sheet to be formed on the jig against centrifugal forces the frame parts 16, 17, and 18 are preferably provided with grip pins 26 which penetrate the soft plastic sheet when it is clamped thereagainst by flat bars 27 by means of stud bolts 28 secured to the base members, and wing nuts 29, as well as by flexible bands 32 and 33, respectively, provided with threaded ends 34 and held against plates 35 and 36, respectively, by wing nuts 37. In order to balance the weight of the jig, including the plastic sheet, counter weights 38, adjustable on and secured by nuts 39 to threaded rods 40 which are attached to the cross heads 8 and secured thereto by nuts 41, are provided. The power for operating the apparatus is furnished by an electric motor 42 of variable speed fastened to the base 43 and which is operatively connected to the pulley 6 by the transmission belting system 45, 46 and 47 to provide the necessary reduction in speed of the apparatus.

Even though it is believed the operation of the apparatus will be apparent from the foregoing description, a brief review thereof will now be made for purposes of summary and simplification, and so that the steps of the forming method will be better understood.

Since the apparatus is especially advantageous for the forming of bubbles having a greater height than obtainable by the free blowing pressure process, the main shape of the bubble is determined by the jig contours, whereby the surface of the bubble which requires perfect optical properties contacts in no way with any part of the jig during the entire manufacturing process. In order to obtain the desired streamline contour on top of the bubble, the jig position is adjusted radially by moving the front and rear arm in or out to set up the proper centrifugal forces at the various bubble cross sections when rotating the shaft. By moving the jig far out from the center of the shaft the cross-sectional contour of the sheet will assume a more parabolic and, when nearer to the center of the shaft, a more circular shape. In addition to the radial adjustment of the jig the speed of the motor can be varied to expand the material more or less, whereby, of course, the material farthest outside tends to bulge out most. It is therefore easily possible to make necessary adjustments to obtain different shapes within relatively wide limits without changing the contours of the jig as such. Prior to the operation of the apparatus the weight of the jig including that of the material is carefully balanced by the counterweights. After the jig has been properly positioned and the speed, giving best results, determined, the sheet material, after being softened by temperatures of between about 250° and 350° F., is draped over the jig and fastened all around its edges by the clamping devices. In clamping, the sheet, previously provided with registering holes, is slipped over the bolts in the sides of the jig frame with the grip pins penetrating the sheet to hold it securely against slipping. The apparatus then is rotated at the proper speed to obtain the desired shape, whereby the bubble cools rapidly so that it can be marked for trimming and removed, or it may be trimmed while on the jig to the finished dimensions. In order to avoid rapid cooling of the sheet during the process of attaching it to the jig, a hot-air filled casing in which the jig will rotate may be advantageous and into which cooling air may be admitted only after complete forming of the sheet. Such a casing may be of particular service in case multiple jigs are used which would require a longer time to be served.

It will be recognized that all objects of the invention have been achieved by not only making it possible to form solely by centrifugal force bubbles having a greater height than one half their base width without the use of expensive dies and without applying pneumatic or hydraulic pressure upon the sheet material, but also by varying the contours between the outer fixed edges of an article. To this must be added the flawless appearance of the finished article at a lower cost than was previously possible.

It is to be understood that the invention as shown by the example illustrated in the drawings shall not be restricted thereto but that different arrangement may be employed, for instance, a plurality of jigs balanced against each other making separate balance weights unnecessary, or the revolving shaft may be arranged in vertical position, and such other changes may be made which are within the scope defined in the appended claims.

I claim:

1. An apparatus for forming by centrifugal force bubbles and like articles made of thermoplastic sheet material comprising a supporting structure including a revolvable shaft and at least one pair of arms spaced from each other, means for separately securing and radially adjusting each arm on said shaft, a jig having contours corresponding to the inner edge contours of the article to be formed, means for adjustably attaching the jig to each pair of said arms, means for clamping at its edges the sheet material to said jig, and means for rotating said shaft.

2. An apparatus for forming by centrifugal force bubbles and like articles made of thermoplastic sheet material comprising a supporting structure including a revolvable shaft, means extending radially from said shaft, a jig secured to the radially extending means, said jig having a contour corresponding to the inner edge contours of the article to be made, means adjustably secured to the shaft for rotation therewith, and adapted to substantially counter-balance the weight of the jig and sheet material, means for clamping the sheet material at its edges to said jig, and means for rotating said shaft to form the sheet material by centrifugal force into the shape desired.

3. An apparatus for forming by centrifugal force bubbles and like articles made of thermoplastic sheet material comprising a supporting structure including a revolvable shaft, at least one pair of arms radially extending from said shaft and being adjustably attached thereto at points spaced axially along the shaft, a link hinged to each arm, a jig having contours corresponding to the inner edge contours of the article to be made, said jig being pivotally attached to the outer ends of said links, means for clamping at its edges the sheet material to be formed to said jig, and means for rotating said shaft.

4. In an apparatus for forming by centrifugal force bubbles and like articles made of thermoplastic sheet material a jig attached to a rotatable shaft, the outer contours of said jig corresponding to the inner edge contours of the article to be formed, pin-like gripping means along said jig contours for cooperating with holes in the sheet material to be formed, and clamping means for securely holding the material only along its edge portions against said gripping means carried by the jig.

5. In an apparatus for forming by centrifugal force bubbles and like articles made of thermoplastic sheet material, a revolvable shaft, radial extensions on said shaft, a jig consisting of outer structural members with their outer contours conforming to the inner contours at the edges of the article to be formed, attachment joints on said jig connecting to said radial extensions, said attachment joints being disposed within the space surrounded by the sheet material being formed, and bracing members united with said joints and tying together said outer structural members.

6. That method of making bubbles or like articles from thermoplastic sheet material by means of a forming jig rotated by a centrifugal apparatus including the steps, tailoring the sheet, uniformly heating the sheet to a temperature to render the sheet capable of bending and stretching, draping the sheet at this temperature over the jig in registered position, clamping the sheet around its edge portion to the jig, selectively positioning spaced portions of the material for rotation about an axis on different radii to throw desired different centrifugal forces into the various portions of the material, and rotating the jig at requisite speed and until the shape of the sheet has assumed the desired streamlined contours and has cooled off sufficiently to hold these contours.

7. That method of making bubbles or similar articles of thermoplastic sheet material, including the steps, of clamping the edge portions of the material in heated and soft condition to a jig conforming to the surrounding edge contours of the article to be formed and leaving the surface of the material between its clamped edge portions completely out of contact with parts of the jig, selectively positioning spaced portions of the material for rotation about an axis on different radii to throw desired different centrifugal forces into the various portions of the material, rotating the jig about an axis of rotation at a speed whereby the material is formed by centrifugal force into the desired shape, and continuing the rotation at a speed to hold the desired shape until the article has cooled and set.

8. Apparatus for centrifugally forming sheet material, including means for supporting edge portions of the material, means for rotating the supporting means to subject the sheet material to centrifugal forces, means associated with the supporting means to independently adjust the radius of rotation of various spaced portions of the sheet material, and variable speed means associated with the means for rotating the supporting means.

9. Apparatus for centrifugally forming sheet material, including means for supporting edge portions of the material, means for rotating the supporting means to subject the sheet material to centrifugal forces and adjustable means associated with the supporting means to change independently the radius of rotary movement and the centrifugal forces applied to various spaced portions of the sheet material.

10. That method of forming sheet material which includes the steps of supporting edge portions of the material while it is in a relatively pliable condition, selectively positioning spaced portions of the material for rotation about an axis on different radii to throw desired centrifugal forces into the various portions of the material, rotating the material around the axis at a speed selected to create desired centrifugal forming forces, and controlling the centrifugal forming action by varying the speed of rotation.

11. An apparatus for forming by centrifugal force bubbles and like articles made of thermoplastic sheet material comprising a supporting structure including a revolvable shaft, arms spaced from each other secured to and adjustable radially of said shaft, a jig having contours corresponding to the inner edge contours of the article to be formed, means for adjustably attaching said jig to said arms, means for clamping the edges of the sheet material to be formed to said jig, means for counter-balancing the weight of the arms, jig and sheet material rotating together with said shaft, and means for rotating said shaft to form the sheet by centrifugal force into the shape desired.

12. An apparatus for forming by centrifugal force bubbles and like articles made of thermoplastic sheet material comprising a supporting structure including a revolvable shaft, means extending radially from and passing through said shaft, means for adjusting the length of radial extension on the radially extending means, jig means secured to the means extending radially from the shaft, said jig means having a contour corresponding to the inner edge contours of the article to be made, means secured to the shaft for rotation therewith and adapted to substantially counterbalance the weight of the jig means and sheet material, means for clamping the sheet material at its edges to said jig means, and means for rotating said shaft whereby the sheet is formed by centrifugal force into the shape desired.

13. That method of making bubbles or like articles from methyl methacrylate sheet material by means of a forming jig rotated by centrifugal apparatus including the steps of setting the front and rear of the jig at proper radial distance from the revolvable shaft of the apparatus, tailoring the sheet, drilling holes in the sheet for registering purposes with corresponding jig bolts, uniformly heating the sheet to a temperature of between about 250° to 350° F. in a heater, draping the sheet at this temperature over the jig in registered position, clamping the sheet around its edge portions to the jig, and leaving the remainder of the sheet unsupported, rotating the jig to form the unsupported portions of the sheet to the desired streamlined contours, and continuing the rotation at a speed to hold the sheet in the desired contour until it has cooled to hold the contours.

14. That method of making bubbles or like articles from thermoplastic sheet material by means of a forming jig rotated by a centrifugal apparatus including the steps of tailoring the sheet, drilling holes in the sheet for registering purposes with corresponding jig bolts, uniformly heating the sheet to a temperature to render the sheet capable of bending, draping the sheet at this temperature over the jig in registered position, clamping the sheet around its edge portions to the jig and leaving the center portion of the sheet unsupported, rotating the jig to move the unsupported portions of the sheet to the desired streamlined contours, and continuing the rotation at a speed to hold the sheet in the desired contour until it has cooled to hold the contours.

15. That method of making bubbles or like articles from thermoplastic sheet material by means of a forming jig rotated by a centrifugal apparatus including the steps of setting the front and rear of the jig at proper radial distance from the revolvable shaft of the apparatus, tailoring the sheet, uniformly heating the sheet to a temperature of between about 250° to 350° F. in a heater, draping the sheet at this temperature over the jig, clamping and supporting the sheet only at the edge of the jig and being unrestrained at any other portion of its surface, and rotating the jig at a speed to form the unsupported portion of the sheet to the desired contours, and continuing the rotation at a speed to hold the sheet in the desired contours until it has cooled off sufficiently to hold these contours.

ROBERT MAYNE.

REFERENCES CITED

The following references are of record in the file of this patent:

UNITED STATES PATENTS

| Number | Name | Date |
| --- | --- | --- |
| 1,474,432 | Gimson | Nov. 20, 1923 |
| 2,118,468 | Jungersen | May 24, 1938 |
| 2,167,539 | Vienneau | July 25, 1939 |
| 2,222,266 | Rubissow | Nov. 19, 1940 |
| 2,325,019 | Rubissow | July 20, 1943 |
| 2,429,692 | Joyce | Oct. 28, 1947 |
| 2,431,102 | Ames | Nov. 18, 1947 |